United States Patent [19]

Barnes

[11] 4,371,145
[45] Feb. 1, 1983

[54] INJECTION MOLD FOR COAXIAL CABLE JOINTING

[75] Inventor: Stuart R. Barnes, London, England

[73] Assignee: International Standard Electric Corporation, New York, N.Y.

[21] Appl. No.: 307,464

[22] Filed: Oct. 1, 1981

[30] Foreign Application Priority Data

Oct. 14, 1980 [GB] United Kingdom ............... 8033084

[51] Int. Cl.³ .......................... B29C 6/00; B29F 1/00
[52] U.S. Cl. ......................................... 249/80; 249/90;
  249/95; 249/142; 249/160; 425/129 R
[58] Field of Search .................. 249/79, 80, 90, 95,
  249/142, 160; 425/129 R

[56] References Cited

U.S. PATENT DOCUMENTS 2,716,623  8/1955  Totor .............................. 249/95 X
2,885,735  5/1959  Dithmgre et al. ..................... 249/90
2,908,744 10/1959  Bollmeier ......................... 249/90 X
3,783,057  1/1974  McNerney ......................... 249/79 X
4,145,176  3/1979  Nelson ......................... 425/129 R X
4,204,896  5/1980  Richardson ....................... 249/95 X
4,295,628 10/1981  Kupf et al. ........................... 249/80
4,338,068  7/1982  Suh et al. ........................ 249/80 X Primary Examiner—J. Howard Flint, Jr.
Attorney, Agent, or Firm—John T. O'Halloran; Robert P. Seitter

[57] ABSTRACT

An injection mold for coaxial cable joints comprises a longitudinally split inner sleeve of duralumin which is placed around the cable joint and a longitudinally split outer jacket of steel. The outer jacket has a bore closely fitting the inner sleeve. The two halves of the outer jacket are readily assembled and disassembled by the use of axially engaging dovetails. The sleeve and jacket have cooperating filling and vent holes and the outer jacket is formed with integral heating and cooling channels.

6 Claims, 8 Drawing Figures

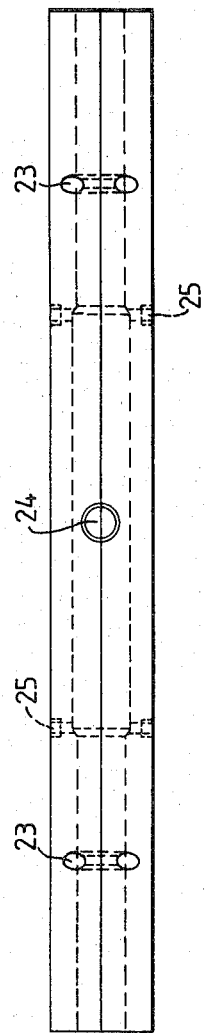
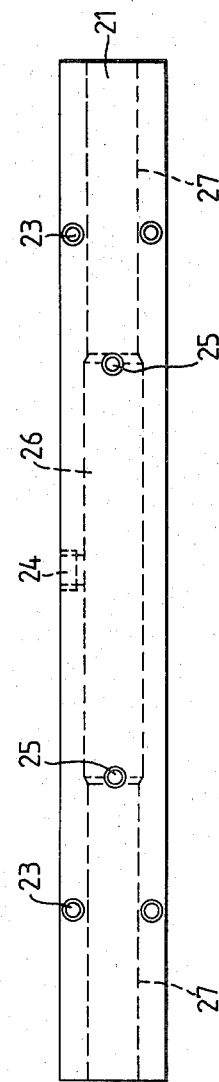
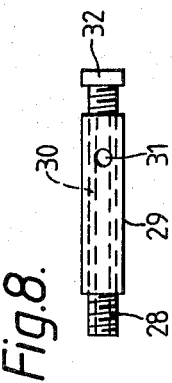
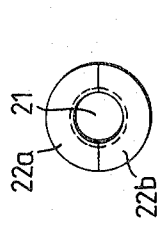
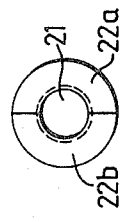

INJECTION MOLD FOR COAXIAL CABLE JOINTING

BACKGROUND OF THE INVENTION

This invention relates to an injection mold for coaxial cable joints.

Typically when jointing coaxial cables the outer dielectric sheath is removed for a short distance each side of the joint in order that the conductors may be jointed. After the joint has been made it is then placed within a mold into which dielectric material is injected under heat and pressure. When the injected material has cooled and set, the mold is removed for re-use on another joint. One problem is that very often different sizes of coaxial cable are required to be used and it is necessary therefore to provide a range of molds. Also, if a simple longitudinally split and bolted mold is used, a significant amount of time is needed to assemble and disassemble the mold for each joint.

SUMMARY OF THE INVENTION

According to the present invention there is provided an injection mold for coaxial cable joints comprising close fitting inner and outer elongate mold portions. The outer mold portion is made from a material having a lower coefficient of thermal expansion than the inner portion. The outer mold is split longitudinally and provided with locking means for assembling the two parts about the inner portion. The inner portion is split longitudinally for assembly about a coaxial cable joint. The inner and outer portions have co-operating filler holes. The outer portion additionally has heating and cooling channels.

BRIEF DESCRIPTION OF THE DRAWING

The above and other features of the invention will become more apparent from the following description of an embodiment of the invention, taken in conjunction with the accompanying drawings in which:

FIGS. 4-7 show four views of the inner mold portion, and

FIG. 8 shows the detachable sprue vent.

DESCRIPTION OF THE PREFERRED EMBODIMENT

Figure 1:
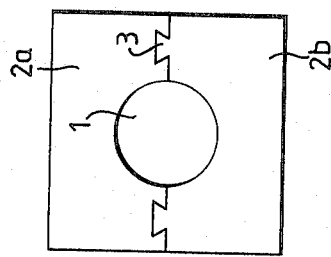
FIGS. 1-3 show three views of the outer mold portion.
Figure 2:
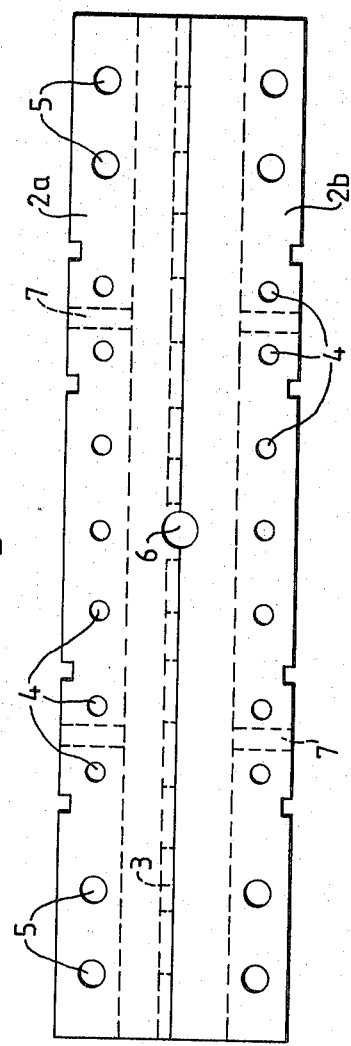
Figure 3:
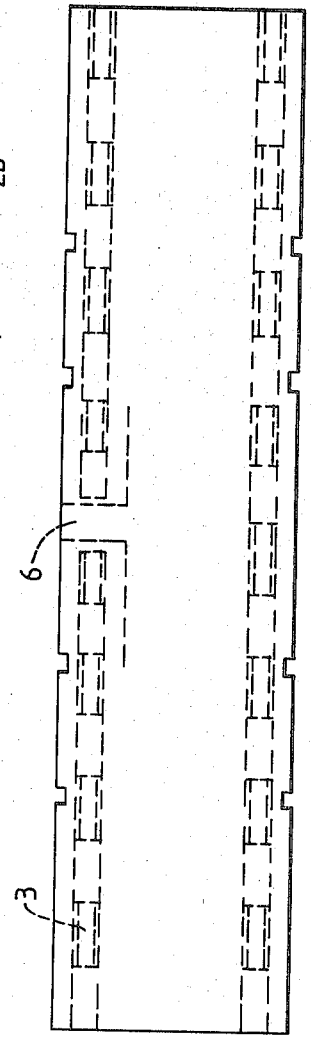

The outer mold portion shown in FIGS. 1-3 is a steel jacket having an internal bore 1 defined by two halves 2a, 2b of a split body. The two halves 2a, 2b are locked together by a dovetail arrangement 3 so that the outer mold portion can be rapidly assembled and disassembled by a short sliding movement between the two halves. The two halves are provided with heating channels 4 in the center section and cooling channels 5 in the end sections. A filler hole 6 is provided in the center and vent holes 7 at points corresponding to the ends of the mold cavity in the inner mold portion.

The inner mold portion shown in FIGS. 4-7 comprises a duralumin sleeve having an internal bore 21 defined by two halves 22a, 22b. The outer diameter of the sleeve is such that when assembled about a coaxial cable it is a close fit within the subsequently assembled steel jacket of FIGS. 1-3. The two halves of the sleeve are not provided with any dovetail locking arrangement like that of the jacket but may have simple bolt holes 23 to accommodate bolts to hold the sleeve together while awaiting the assembly of the steel jacket. The bolts also serve to locate the two halves of the sleeve relative to one another so that there is no relative longitudinal displacement of the two halves. The sleeve is provided with a filler hole 24 and vent holes 25. The bore of the sleeve is enlarged for a central portion of its length to provide an injection cavity 26, while the two end portions 27 are a close fit about the normal outside diameter of the coaxial cable.

The detachable sprue vent shown in FIG. 8 comprises a tubular body 29 having a threaded end portion 28. The tubular body is inserted through the filler hole 6 in the outer mold portion, FIGS. 2 and 3, and the threaded end portion engages with the threaded filler hold 24 in the inner mold portion, FIGS. 5 and 7. The sprue vent has a threaded bore 30 which allows the dielectric material to be released from the mold when full. A vent hole 31 is provided towards the outer end of the sprue vent. Once the flow in is detected at the vent hole a closure plug 32 is screwed into the bore to terminate the flow. The sprue vent also serves to locate and prevent longitudinal movement of the inner mold portion in the outer mold portion.

In use, once the conductor welding has been completed the inner sleeve is assembled around the joint and holding bolts are secured in the holes 25. The two halves of the outer jacket are then placed in position about the sleeve and locked together by a relative sliding movement of the two halves, taking care to ensure that the vent and filler holes in the jacket are aligned with those of the sleeve. The sprue vents, FIG. 8, are then located through the outer mold into the inner portion. The heating and cooling channels in the jacket are coupled to heating and cooling equipment. The dielectric material is then injected into the mold via the filler hole in the conventional manner. Once the whole arrangement has cooled down, the outer jacket is removed and then the inner sleeve.

It is to be noted that assembly and disassembly are greatly facilitated by the provision of suitable tolerances between the inner sleeve and the outer jacket such that when the complete mold is heated the difference in thermal expansion between the sleeve and jacket ensure that the jacket grips the sleeve tightly. When the assembly is subsequently cooled the greater contraction of the sleeve renders the jacket readily removable.

It is clear that the same outer jacket can be used with a variety of inner sleeves of different bore diameters, thereby enabling one jacket to be used with different sleeves for a number of different coaxial cable sizes.

While I have described above the principles of my invention in connection with specific apparatus, it is to be clearly understood that this description is made only by way of example and not as a limitation to the scope of my invention as set forth in the objects thereof and in the accompanying claims.

I claim:

1. An injection mold for coaxial cable joints comprising:

an outer elongate mold portion having a longitudinal split, an inner elongate mold portion disposed in said outer portion and having a higher coefficient of thermal expansion than said outer portion, said inner portion having a longitudinal split, said outer portion having a longitudinal split and locking means for assembly around said inner portion, heating and cooling channels located in said outer portion, and cooperating filler holes disposed in said inner and outer portions.

2. The mold according to claim 1 wherein said locking means comprises axially engageable dovetails.

3. The mold according to claim 2 wherein the outer portion is made of steel.

4. The mold according to claim 1 wherein the inner portion is made of duralumin.

5. The mold according to any one of the preceding claims 1-4 wherein said inner portion comprises two sections and is provided with means for securing said two sections together prior to assembly of said outer portion around said inner portion.

6. An injection mold for coaxial cable joints comprising an outer elongate mold portion, a plurality of inner mold portions, said outer mold portion having a longitudinal split and locking means for receiving and securing at least one of said inner mold portions, said outer portion having heating and cooling channels, at least one of said inner mold portions having an outside diameter which is a close fit in the outer mold portion and an inside diameter, each of said inner mold portions having a longitudinal split and a higher coefficient of thermal expansion than said outer portion, said outer mold portion having a filler hold and each of said inner mold portions having a corresponding filler hole.

* * * * *